United States Patent
Kim

(10) Patent No.: US 9,848,734 B2
(45) Date of Patent: Dec. 26, 2017

(54) ECO-FRIENDLY COOKING LID

(71) Applicant: ECOZERO CO., LTD., Seoul (KR)

(72) Inventor: Youn Whan Kim, Seoul (KR)

(73) Assignee: ECOZERO CO., LTD., Seoul (KR)

( * ) Notice: Subject to any disclaimer, the term of this patent is extended or adjusted under 35 U.S.C. 154(b) by 0 days.

(21) Appl. No.: 14/894,137

(22) PCT Filed: Dec. 30, 2014

(86) PCT No.: PCT/KR2014/013007
§ 371 (c)(1),
(2) Date: Nov. 25, 2015

(87) PCT Pub. No.: WO2016/021786
PCT Pub. Date: Feb. 11, 2016

(65) Prior Publication Data
US 2016/0174769 A1 Jun. 23, 2016

(30) Foreign Application Priority Data
Aug. 2, 2014 (KR) .................. 10-2014-0099355

(51) Int. Cl.
*B65D 25/28* (2006.01)
*A47J 37/10* (2006.01)
*A47J 36/06* (2006.01)

(52) U.S. Cl.
CPC ............. *A47J 37/101* (2013.01); *A47J 36/06* (2013.01)

(58) Field of Classification Search
CPC ..... A47J 37/101; A47J 36/06; B65D 2205/02; B65D 2205/00; B65D 43/00; B65D 51/00; B65D 51/16
(Continued)

(56) References Cited

U.S. PATENT DOCUMENTS 3,999,680 A * 12/1976 Cho ...................... A47J 37/101
                                                            220/366.1
4,108,332 A *  8/1978 Thompson ............ A47J 37/101
                                                            220/370
(Continued)

FOREIGN PATENT DOCUMENTS

JP      10-137111 A    5/1998
JP   2008-534115 A    8/2008
(Continued)

*Primary Examiner* — Kareen Thomas
(74) *Attorney, Agent, or Firm* — Novick, Kim & Lee, PLLC; Jae Youn Kim

(57) ABSTRACT

Disclosed is an eco-friendly cooking including a lid main body including a hollow body formed of heat-resistant transparent glass, openings formed on the side surface of the body, and hinge coupling units provided adjacent to the openings, inlets, each including a cover provided with one end coupled with the hinge coupling unit by a hinge to open and close the opening and including at least one air vent, and a grasping terminal formed on the upper surface of the cover, a sealing weight provided on the lower surface of the cover, a handle provided at the upper end of the lid main body and including a grasping part and a through hole formed at the grasping part, and an exhaust pipe including an exhaust pipe main body provided with a lower end inserted into the through hole and a tubular connection member combined with the exhaust pipe main body.

3 Claims, 3 Drawing Sheets

(58) Field of Classification Search
USPC .... 220/212.5, 573.1–573.5, 912, 231, 367.1,
220/366.1, 259.2, 254.1, 254.2, 254.3;
206/216; 99/422, 348, 341, 645, 646 C
See application file for complete search history.

(56) References Cited

U.S. PATENT DOCUMENTS

| | | | | |
|---|---|---|---|---|
| 4,852,755 | A * | 8/1989 | Michel | A47J 37/101 |
| | | | | 206/547 |
| 5,996,574 | A * | 12/1999 | Loyd | A47J 27/58 |
| | | | | 126/384.1 |
| 6,237,470 | B1 * | 5/2001 | Adams | A47J 37/101 |
| | | | | 220/573.1 |
| 2009/0261110 | A1 * | 10/2009 | Choi | A47J 37/101 |
| | | | | 220/573.1 |

FOREIGN PATENT DOCUMENTS

| | | |
|---|---|---|
| KR | 10-0766464 B1 | 10/2007 |
| KR | 10-1303997 B1 | 9/2013 |

* cited by examiner

ECO-FRIENDLY COOKING LID

TECHNICAL FIELD

The present invention relates to an eco-friendly cooking lid and, more particularly, to an eco-friendly cooking lid in which food is cooked without opening of the lid of a frying pan-type cooker and a magnet-type corrugated connection tube is installed on the upper part of the lid so as to effectively exhaust steam or oil mist from the inside of the lid to a kitchen hood, to allow food and a cooking tool to be easily input to the cooker, and to be easily cleaned after cooking.

BACKGROUND ART

In general, a frying pan lid (or cover) has a generally closed structure in which steam or oil mist is exhausted through an upper handle part and, thus, in order to put food into the frying pan or to turn fried food, the lid needs to be opened and then oil or odor is exhausted from the inside to the outside of the frying pan and contaminates indoor air.

As one method to solve such a problem, Korean Registered Patent No. 1303997 (Registration Date: 2013 Aug., 29, Title: Eco-friendly frying pan lid), filed by the present applicant, discloses an eco-friendly frying pan lid including a hemispherical lid main body having a hollow structure and formed of heat-resistant transparent glass, at least one cooking tool inlet including at least one first sealing window and a screen respectively installed at the first sealing window and provided at the lower part of the lid main body, an opening and closing unit including a second sealing window and a cover formed of heat-resistant glass and having a handle removably inserted into the second sealing window and provided on the outer surface of the cover, and provided on the side surface of the lower part of the lid main body, a handle unit including a grasping part and a corrugated tube installation hole formed at the end of the grasping part and provided at the upper end of the lid main body, and a corrugated tube provided with a lower end inserted into the corrugated tube installation hole, as exemplarily shown in FIGS. 1 and 2, and the screen is cut in several directions based on a brush or the center of the screen and formed of carbon nano-fibers or silicon.

The above technology proposed by the present applicant may maximally prevent oil from scattering and odor from dispersing during cooking but may cause difficulty in cleaning the screen or the cover after cooking or require repeated replacement of the contaminated or damaged screen.

DISCLOSURE

Technical Problem

Therefore, the present invention has been made in view of the above problems, and it is an object of the present invention to provide an eco-friendly cooking lid which is conveniently cleaned during cooking and does not require a screen so as to prevent frequent replacement of the screen.

Technical Solution

In accordance with an aspect of the present invention, the above and other objects can be accomplished by the provision of an eco-friendly cooking lid including a lid main body including a body having a hollow structure and formed of heat-resistant transparent glass, openings formed on the side surface of the body, and hinge coupling units provided at positions of the body adjacent to the openings, inlets, each including a cover provided with one end coupled with the hinge coupling unit by a hinge so as to open and close the opening of the body and including at least one air vent, and a grasping terminal formed on the upper surface of the cover, a sealing weight provided on the lower surface of the cover to hermetically seal the opening, a handle provided at the upper end of the lid main body and including a grasping part and a through hole formed at the end of the grasping part, and an exhaust pipe including an exhaust pipe main body provided with a lower end inserted into the through hole and a tubular connection member combined with the upper end of the exhaust pipe main body.

The sealing weight may be formed by coating the surface of a weight formed of stainless steel, copper or aluminum with non-toxic silicone.

In the exhaust pipe, the exhaust pipe main body and the connection member may be combined so as to be separable from each other.

Advantageous Effects

As described above, in the eco-friendly cooking lid of the present invention, food is cooked without opening of the lid of a frying pan-type cooker and a magnet-type corrugated tube is installed on the upper part of the lid, thereby effectively exhausting steam or oil mist to a kitchen hood and allowing food and a cooking tool to be easily input to the cooker. Particularly, the eco-friendly cooking lid of the present invention is simply cleaned after cooking and requires no screen, thus not requiring frequent replacement of the screen.

Further, the eco-friendly cooking lid of the present invention is completely hermetically sealed and may thus prevent leakage of noise or oil mist generated during cooking.

DESCRIPTION OF DRAWINGS

The above and other objects, features and other advantages of the present invention will be more clearly understood from the following detailed description taken in conjunction with the accompanying drawings, in which.

BEST MODE

Now, embodiments of the present invention will be described with reference to the accompanying drawings.

Figure 1:
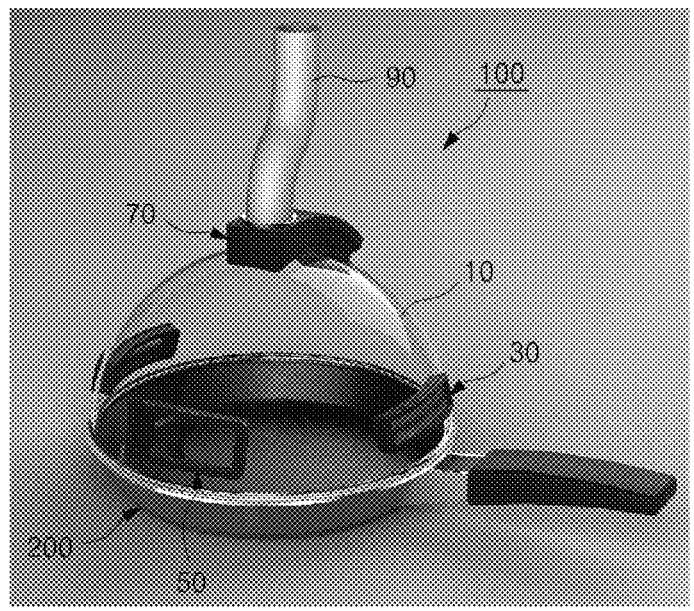
FIG. 1 is a perspective view of a conventional eco-friendly frying pan lid in use.
Figure 2:
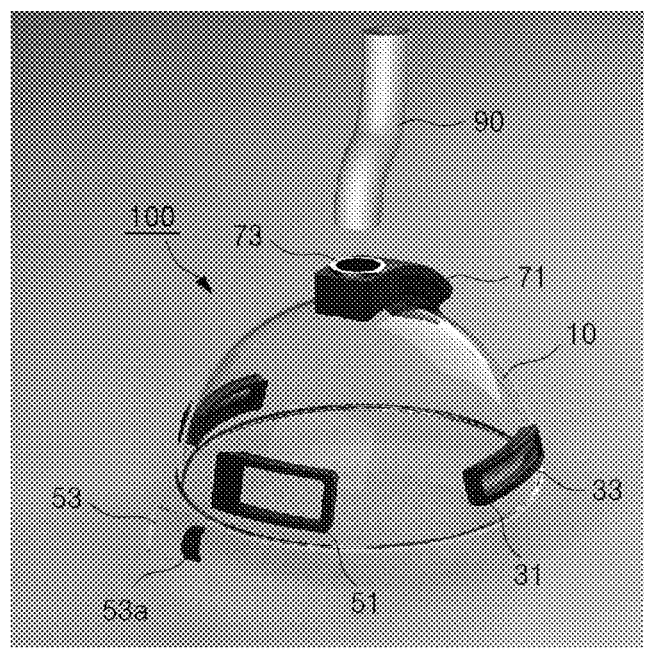
FIG. 2 is an exploded perspective view of the eco-friendly frying pan lid of FIG. 1.
Figure 3:
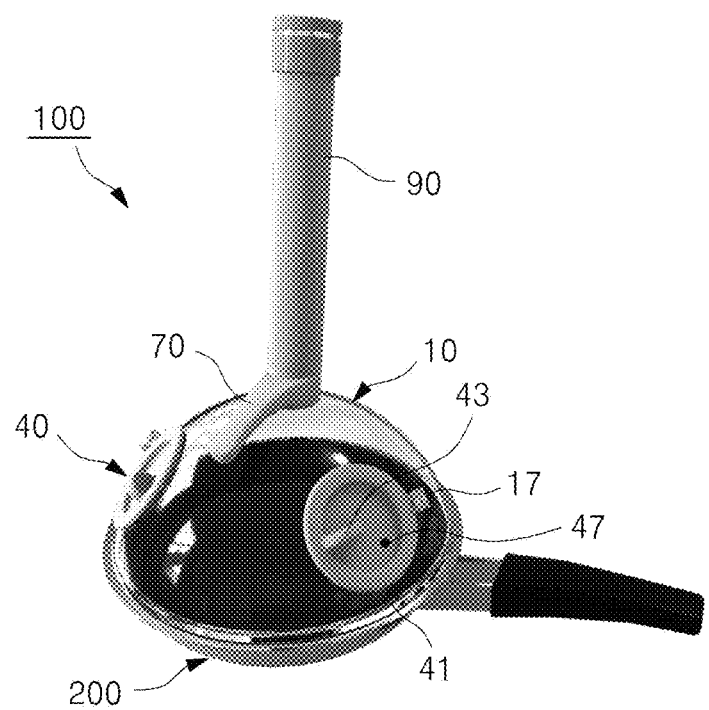
FIG. 3 is a perspective view of an eco-friendly cooking lid in accordance with the present invention.
Figure 4:
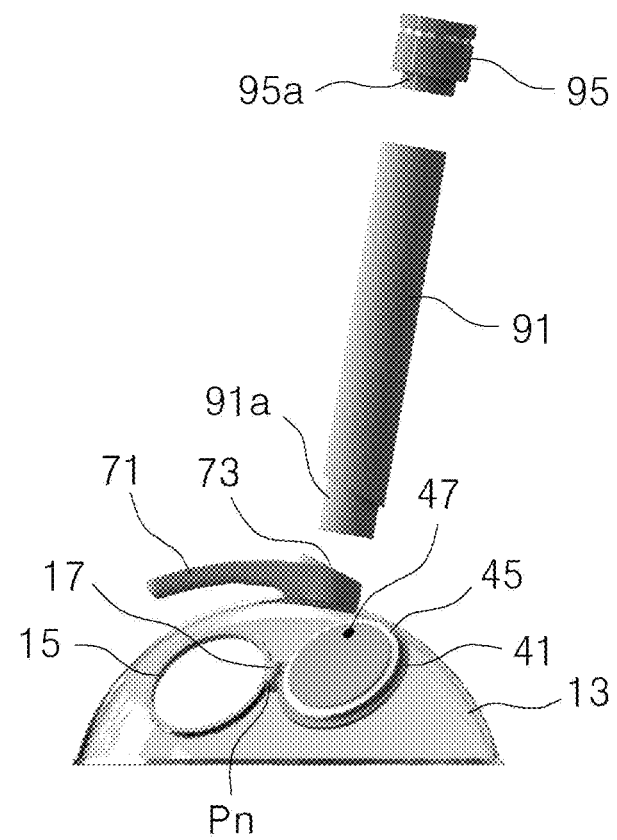
FIG. 4 is a side view of the eco-friendly cooking lid.

With reference to FIGS. 3 and 4, an eco-friendly cooking lid 100 in accordance with the present invention includes a lid main body 10, inlets 40, a handle 70, and an exhaust pipe 90.

The lid main body 10 includes a hemispherical body 13 having a hollow structure and formed of heat-resistant transparent glass, openings 15 formed on the side surface of the body 13, and hinge coupling units 17 provided at positions of the body 13 adjacent to the openings 15. Here, the outer circumference of the lower end of the body 13 is combined with the upper end of a frying pan 200. Further, in order to prevent difficulty in observing the cooking state at the inside of the lid main body 10 with the naked eye due to generation of fog within the lid main body 10 during cooking, a water-repellent coating is applied to the inner surface of the cooking main body 10.

Although this embodiment describes that two openings 15 and two hinge coupling units 17 are provided, one opening 15 and one hinge coupling unit 17 or three or more openings 15 and three or more hinge coupling units 17 may be formed.

Further, although this embodiment describes the lid main body 10 as having a hemispherical shape with a hollow structure, the shape of the lid main body 10 may be variously modified.

The inlet 40 includes a cover 41 provided with one end coupled with the hinge coupling unit 17 by a hinge pin Pn so as to open and close the opening 15 formed on the side surface of the body 13, a grasping terminal 43 formed on the upper surface of the cover 43, and a sealing weight 45 provided on the lower surface of the cover 43 to hermetically seal the opening 15. Here, in order to prevent leakage of steam or oil mist through a gap between the opening 15 and the cover 41, the sealing weight 45 is formed by coating the surface of a disc-shaped weight formed of stainless steel, copper or aluminum with non-toxic silicone.

Further, through the inlet 40 of the present invention, food is input to the frying pan or a cooling tool is input to the frying pan.

At least one air vent 47 is formed on the cover 41 of the inlet 40.

The handle 70 is formed at the upper end of the lid main body 10 and includes a grasping part 71 extending to a long length so as to be easily grasped by a user. Further, in the handle 70, a through hole 73, which communicates with an opening (or a hole) formed at the upper end of the lid main body 19 and into which the lower end of the exhaust pipe 90 is inserted, is formed at the end of the grasping part 71.

The exhaust pipe 90 includes an exhaust pipe main body 91 provided with a lower end 91a inserted into the through hole 73, and a connection member 95 provided with a lower end 95a separably combined with the upper end of the exhaust pipe main body 91. Here, although the exhaust pipe 90 may be formed of metal, the exhaust pipe 90 in accordance with this embodiment is formed of a heat-resistant synthetic resin so as to achieve light weight and, particularly, is easily separated from the handle 70 so as to be conveniently cleaned.

The upper end of the connection member 95 may be combined with a corrugated tube communicating with a kitchen hood so as to forcibly exhaust contaminated gas, such as steam or oil mist generated during cooking.

Further, a removable charcoal filter may be installed at the lower end 91a of the exhaust pipe main body 91 and the lower end 95a of the connection member 95, thus filtering oil mist.

As apparent from the above description, in the eco-friendly cooking lid of the present invention, when a user grasps and lifts the grasping terminal 43 formed on the upper surface of the cover 41, the cover 43 is rotated about the hinge coupling unit 17 and thus opened and, on the other hand, when the user grasps and lowers the grasping terminal 43, the sealing weight 45 provided on the lower surface of the cover 41 hermetically seals the opening 15 and thus leakage of steam or oil mist to the outside during cooking may be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An eco-friendly cooking lid comprising:
    a lid main body including a body having a hollow structure and formed of heat-resistant transparent glass, openings formed on a side surface of the body, and hinge coupling units provided at positions of the body adjacent to the openings;
    inlets, each including a cover provided with one end coupled with the hinge coupling unit by a hinge so as to open and close each opening of the body and including at least one air vent, and a grasping terminal formed on an upper surface of the cover;
    a sealing weight provided on a lower surface of the cover to hermetically seal the opening;
    a handle provided at an upper end of the lid main body and including a grasping part and a through hole formed at an end of the grasping part; and
    an exhaust pipe including an exhaust pipe main body provided with a lower end inserted into the through hole and a tubular connection member combined with an upper end of the exhaust pipe main body.

2. The eco-friendly cooking lid according to claim 1, wherein the sealing weight is formed by coating a surface of a weight formed of stainless steel, copper or aluminum with non-toxic silicone.

3. The eco-friendly cooking lid according to claim 1, wherein, in the exhaust pipe, the exhaust pipe main body and the connection member are combined so as to be separable from each other.

* * * * *